(12) United States Patent
Maloney

(10) Patent No.: US 7,177,840 B2
(45) Date of Patent: Feb. 13, 2007

(54) METHOD AND SYSTEM FOR PROCESSING IMAGES FOR A CHECK SORTER

(75) Inventor: Rian R. Maloney, Plano, TX (US)

(73) Assignee: VECTORsgi, Inc., Addison, TX (US)

( * ) Notice: Subject to any disclaimer, the term of this patent is extended or adjusted under 35 U.S.C. 154(b) by 1184 days.

(21) Appl. No.: 09/872,392

(22) Filed: Jun. 1, 2001

(65) Prior Publication Data

US 2002/0184151 A1    Dec. 5, 2002

(51) Int. Cl.
*G06Q 40/00*    (2006.01)

(52) U.S. Cl. ............... 705/45; 705/30; 705/35; 235/379; 382/305; 382/232; 355/320

(58) Field of Classification Search ........... 705/30, 705/35, 45; 235/379; 382/305, 232; 355/320
See application file for complete search history.

(56) References Cited

U.S. PATENT DOCUMENTS

| | | | |
|---|---|---|---|
| 4,520,447 A | 5/1985 | Nara | 364/478 |
| 4,649,494 A | 3/1987 | Rosas | 364/478 |
| 4,888,812 A | 12/1989 | Dinan et al. | 382/7 |
| 5,025,483 A | 6/1991 | Dinan et al. | 382/58 |
| 5,159,548 A | 10/1992 | Caslavka | 364/408 |
| 5,167,021 A | 11/1992 | Needham | 395/275 |
| 5,208,869 A | 5/1993 | Holt | 382/7 |
| 5,274,567 A | 12/1993 | Kallin et al. | 364/478 |
| 5,534,682 A | 7/1996 | Graef et al. | 235/379 |
| 5,544,043 A | 8/1996 | Miki et al. | 364/406 |
| 5,602,936 A | 2/1997 | Green et al. | 382/140 |
| 5,678,046 A * | 10/1997 | Cahill et al. | 707/200 |
| 5,689,579 A | 11/1997 | Josephson | 382/137 |
| 5,784,503 A | 7/1998 | Bleecker, III et al. | |
| 5,790,260 A | 8/1998 | Myers | 358/296 |
| 5,825,009 A | 10/1998 | Schmid et al. | 235/462 |
| 5,870,725 A | 2/1999 | Bellinger et al. | 705/45 |
| 5,910,988 A | 6/1999 | Ballard | 380/24 |
| 5,926,392 A | 7/1999 | York et al. | |

(Continued)

FOREIGN PATENT DOCUMENTS

EP    0 653 734 A2    11/1994

(Continued)

OTHER PUBLICATIONS

PCT International Search Report in International Application No. 01/11279, dated Oct. 26, 2001, 7 pages.

(Continued)

*Primary Examiner*—Ella Colbert
*Assistant Examiner*—Harish T. Dass
(74) *Attorney, Agent, or Firm*—Fish & Richardson P.C.

(57) ABSTRACT

A system for imaging checks is provided that includes an image capture host and a database. The image capture host is coupled to a sorter that is operable to sort a plurality of checks, to retrieve data from the checks and to record digital images of the checks. The image capture host is operable to obtain the digital images of the checks recorded by the sorter. The database is external to the sorter and is coupled to the image capture host. The database is operable to store the digital images of the checks obtained by the image capture host.

12 Claims, 2 Drawing Sheets

U.S. PATENT DOCUMENTS

| | | | |
|---|---|---|---|
| 6,009,261 A | 12/1999 | Scalzi et al. | 395/500.47 |
| 6,023,705 A | 2/2000 | Bellinger et al. | 707/200 |
| 6,032,137 A | 2/2000 | Ballard | 705/75 |
| 6,142,682 A | 11/2000 | Skogby | 395/500.47 |
| 6,181,837 B1 | 1/2001 | Cahill et al. | 382/305 |
| 6,446,072 B1 | 9/2002 | Schulze et al. | 707/10 |
| 2003/0037002 A1 | 2/2003 | Higgins et al. | 705/45 |

FOREIGN PATENT DOCUMENTS

| | | |
|---|---|---|
| EP | 0658 823 A2 * | 12/1994 |
| EP | 0 841 643 A1 | 10/1997 |
| EP | 0 845 763 A1 | 10/1997 |

OTHER PUBLICATIONS

PCT International Search Report in International Application No. 01/12837, dated Nov. 29, 2001, 8 pages.

U.S. Appl. No. 09/558,749, entitled "Method and System for Emulationg A Check Sorter," filed Apr. 20, 2000, 45 pages.

U.S. Appl. No. 09/553,228, entitled "Method and System for Online Communication Between A Check Sorter and A Check Processing System," filed Apr. 20, 2000, 45 pages.

Office Action issued by Canadian Intellectual Property Office for Application No. 2,449,798, mailed Jun. 14, 2005, 4 pages.

* cited by examiner

US 7,177,840 B2

METHOD AND SYSTEM FOR PROCESSING IMAGES FOR A CHECK SORTER

TECHNICAL FIELD OF THE INVENTION

This invention relates generally to the field of document processing in the financial industry and more particularly to a method and system for processing images for a check sorter.

BACKGROUND OF THE INVENTION

Within the financial industry, document processing is an important part of the daily management of a business. Document processing systems include sorters for physically handling and retrieving data from checks and other items and data processors for analyzing and storing the retrieved data. The sorters and data processors intercommunicate data and instructions to individually read and process each check.

Conventional document sorters include microfilm and/or digital cameras for recording images of the documents being sorted. For digital images recorded by a digital camera, conventional sorters typically store these images within the sorter. Thus, a limited amount of memory is available, resulting in a limit on the number of images which may be stored. In addition, future use of the stored images generally requires that the images be retrieved from the memory of the sorter.

SUMMARY OF THE INVENTION

In accordance with the present invention, a method and system for processing images for a document sorter are provided that substantially eliminate or reduce disadvantages and problems associated with previously developed systems and methods. In particular, digital images of documents are transmitted using Transmission Control Protocol/Internet Protocol (TCP/IP) directly from the document sorter to an image capture host which generates storable images for storage in an external database.

In one embodiment of the present invention, a system for imaging checks is provided that includes an image capture host and a database. The image capture host is coupled to a sorter that is operable to sort a plurality of checks, to retrieve data from the checks and to record digital images of the checks. The image capture host is operable to obtain the digital images of the checks recorded by the sorter. The database is external to the sorter and is coupled to the image capture host. The database is operable to store the digital images of the checks obtained by the image capture host.

In another embodiment of the present invention, a system is provided for storing and indexing a plurality of images of checks. The system comprises a database which comprises a plurality of records. Each record corresponds to an image of a check. Each record comprises a front/back identifier field, a date field, a sequence number field, and a file format field. The front/back identifier field is operable to identify whether the image comprises a front image or a back image of the check. The date field comprises a specified date for the check. The sequence number field comprises a specified sequence number for the check. The file format field is operable to identify a file format for the image.

Technical advantages of the present invention include providing an improved check imaging system. In a particular embodiment, digital images of the checks are transmitted directly from the digital camera of the check sorter to an image capture host using TCP/IP. The image capture host generates storable images for storage in an external database. As a result, the amount of memory available for storing images is substantially increased. In addition, the images may be retrieved from the database by a variety of hardware and/or software components.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
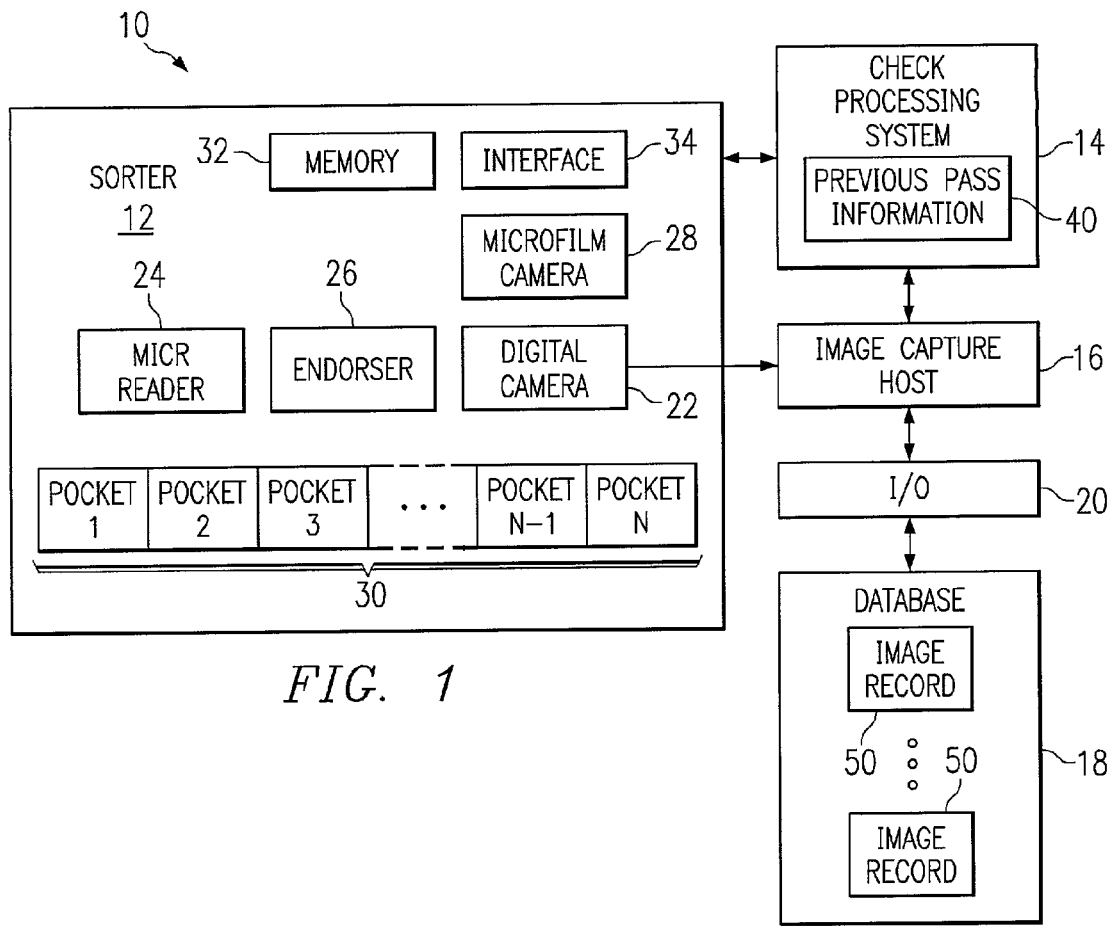
FIG. 1 is a block diagram illustrating a system for processing images for a check sorter in accordance with one embodiment of the present invention.

FIG. 1 is a block diagram illustrating a system 10 for processing images for a check sorter 12 in accordance with one embodiment of the present invention. The system 10 comprises a check sorter 12 for sorting documents, such as checks, for a financial institution or other suitable type of business, a check processing system 14 for making decisions regarding how the sorter 12 is to process the checks and for notifying the sorter 12 of the decisions, an image capture host 16 for capturing images of the checks sorted by the sorter 12, an image database 18 external to the sorter 12 for storing images captured by the image capture host 16, and an input/output (I/O) interface 20 for transmitting data between the image capture host 16 and the database 18.

In accordance with the illustrated embodiment, the sorter 12 comprises a check sorter, such as a sorter available from NCR, BancTec, Unisys, or Digital Check, or other suitable check sorter. However, it will be understood that the sorter 12 may comprise any suitable device capable of physically sorting documents and obtaining information from the documents without departing from the scope of the present invention.

The sorter 12 comprises a digital camera 22 for recording digital images of checks, a Magnetic Ink Character Recognition (MICR) reader 24 for retrieving MICR data from checks, an endorser 26 for endorsing checks, a microfilm camera 28 for recording microfilm images of checks, and a plurality of pockets 30 for receiving sorted checks.

The digital camera 22 may record an image of the front and/or the back of each check and may record these images in black and white, gray scale and/or color. As used herein, "each" means every one of at least a subset of the identified items. Thus, different imaging data may be obtained for different checks. For example, the digital camera 22 may record a black and white image of the front of a first check and a gray scale image of the back of the first check and may record a color image of the front and the back of a second check. The digital images recorded by the digital camera 22 may be in any suitable format, such as Moving Picture Experts Group, Joint Photographic Experts Group, Tag Image File Format, and the like. It will be understood that the digital camera 22 may comprise one or more devices for recording digital images of checks being processed by the system 10.

The MICR reader 24 retrieves MICR data from checks. The MICR data comprises, for example, a routing and transit number, an account number, a unique sequence number, and the like. The endorser 26 provides stamped endorsement for a check upon approval. The microfilm camera 28 records microfilm images of checks for storage. The pockets 30 physically separate checks for bundling or other suitable processing.

A memory 32 in the sorter 12 comprises a process buffer that stores data associated with the check currently being processed by the sorter 12. For example, the process buffer comprises the MICR data retrieved from the checks by the MICR reader 24. The process buffer may be a copy or adaptation of the retrieved data.

The sorter 12 processes each check based on feature instructions regarding the features of the digital camera 22, the endorser 26, the microfilm camera 28, and the pockets 30. In one embodiment, the feature instructions are received from the check processing system 14 through an interface 34. The interface 34 interprets and processes data provided by the check processing system 14. Thus, based on the processing data from the check processing system 14, the interface 34 determines for each check whether or not to endorse the check, record a microfilm image of the check and record a digital image of the check. The interface 34 also determines for each check which digital images and what types of digital images the digital camera 22 is to record, if any, and which pocket 30 is to receive the check.

The check processing system 14 may comprise any suitable combination of one or more of Vector:Sort, Check Processing Control System, SuperMICR, or any other suitable check processing system, and may be implemented on a mainframe. The check processing system 14 is operable to communicate with the sorter 12 and to make decisions regarding the processing of the check in real time based on the data in the process buffer.

The check processing system 14 comprises previous pass information 40 relating to checks which have been passed through the sorter 12 previously. The previous pass information 40 may comprise any suitable identifying information as an identifier and other data, such as MICR data or any other suitable data relating to the check, for each of a plurality of checks previously processed by the check processing system 14. Thus, for example, if a tray of checks being processed by the sorter 12 is dropped or if the sorter 12 jams or if any other situation results in the checks being re-ordered after a portion of the checks have been processed, the previous pass information 40 is able to provide processing data that was previously generated by the check processing system 14 for each of the previously processed checks, thereby eliminating the need to fully process those checks a second time. In addition, a batch of checks that was previously sorted into a same pocket 30 may be sorted again into different pockets 30. In this situation also, the previous pass information 40 improves the efficiency of the check processing system 14.

According to one embodiment, the previous pass information 40 is stored in a personal computer or other suitable device operable to store and process data. The previous pass information 40 may comprise any suitable number of identifiers and related data for previously processed checks.

The image capture host 16 is operable to obtain the processing data from the check processing system 14 for a check that is to be imaged by the digital camera 22. As used herein, "to obtain" data means to receive data transmitted by another component, to retrieve data stored in another component, or to obtain the data by any other suitable means. In an alternative embodiment, the image capture host 16 is operable to obtain the processing data from the process buffer in the memory 32 of the sorter 12. The image capture host 16 is also operable to obtain image data for the check from the digital camera 22 and to generate an image record 50 comprising the image data and at least a portion of the processing data. The image capture host 16 is also operable to provide the image record 50 to the database 18 through the I/O interface 20.

According to one embodiment, the image capture host 16 is a computer comprising logic for performing the functions described above. The logic may be encoded in hardware, such as a field-programmable gate array, an application-specific integrated circuit, or the like, and/or software instructions stored in RAM, ROM and/or other suitable computer-readable media for performing the functions associated with the image capture host 16.

The database 18 is external to the sorter 12 and is operable to store a plurality of image records 50. The image records 50 comprise digital image data corresponding to check images recorded by the digital camera 22, in addition to identifying information as described in more detail below in connection with FIG. 3. The database 18 obtains the digital image data recorded by the digital camera 22, along with the identifying information, from the image capture host 16 through the I/O interface 20.

In operation, a set of checks is provided to the sorter 12 for processing. As each check is passed through the sorter 12, the MICR reader 24 retrieves the MICR data from the check and copies this data to the process buffer in the memory 32. The sorter 12 then notifies the check processing system 14 that the process buffer is available for processing. The check processing system 14 then obtains the MICR data for the check from the process buffer in the memory 32.

After the check processing system 14 finishes generating processing data for the check, the check processing system 14 updates the process buffer in the memory 32 with the processing data, which includes instructions for processing the check. According to one embodiment, the processing data indicates whether an image is to be recorded by the microfilm camera 28 and, if so, whether a predetermined number of checks have been recorded by the microfilm camera 28, causing a pause to occur while the microfilm is spaced. The processing data also indicates whether or not a flash is to be enabled for lighting the check as the microfilm camera 28 records a microfilm image of the check. The processing data also indicates whether endorsement data is to be printed on the check by the endorser 26 and which pocket 30 is to receive the check. The processing data also indicates whether any images are to be recorded by the digital camera 22, as well as which images and what types of images.

After updating the process buffer in the memory 32 with the processing data, the check processing system 14 notifies the sorter 12 that the update is complete, allowing the interface 34 to begin interpreting the processing data in order to allow the sorter 12 to complete the processing of the check.

Thus, as previously described, the processing data instructs the interface 34 whether or not the check is to be endorsed, a microfilm image of the check is to be recorded, and a digital image of the check is to be recorded. The interface 34 then signals the digital camera 22, the endorser 26 and/or the microfilm camera 28 in accordance with the feature instructions. According to one embodiment, the interface 34 provides a signal to each of the features 22, 26 and/or 28 which are to be activated and provides no signal to the features 22, 26 and/or 28 which are not to be activated.

For the digital camera 22, the interface 34 also notifies the digital camera 22 which images (front and/or back) to record, what type of image (black and white, gray scale or color) to record for the front and what type of image to record for the back. The interface 34 also identifies a pocket 30 to the sorter 12 for the check. After any requested endorsement is performed and images are recorded, the sorter 12 directs the check to the pocket 30 identified by the interface 34.

If the processing data indicates that the digital camera 22 is to record an image of the check, the image capture host 16 obtains the digital image data recorded by the digital camera 22. According to one embodiment, the digital camera 22 transmits the digital image data to the image capture host 16 using Transmission Control Protocol/Internet Protocol (TCP/IP). It will be understood, however, that the digital camera 22 may transmit data to the image capture host 16 using other suitable types of communication.

The image capture host 16 also obtains the processing data for the check from the check processing system 14 or from the process buffer of the sorter 12. Based on the processing data, the image capture host 16 determines whether or not the check being processed by the sorter 12 has been processed previously.

If the check has been processed previously, the image capture host 16 matches an identifier for the check in the processing data to an identifier in the previous pass information 40. The image capture host 16 then obtains at least a portion of the data corresponding to the check from the previous pass information 40 in the check processing system 14. This data is used instead of the corresponding processing data that was previously obtained in order to provide consistency. For example, the image capture host 16 may obtain an original date and an original sequence number for the check in order to uniquely identify a check whose date and/or sequence number may have been modified from one pass to another. If the check has not been processed previously, the image capture host 16 simply utilizes the processing data obtained from the check processing system 14 or from the process buffer of the sorter 12.

The image capture host 16 generates one or more image records 50 for the check, each image record 50 comprising the digital image data from the digital camera 22 as well as at least a portion of the processing data, which may include original data obtained from the previous pass information 40. The image capture host 16 provides the generated image records 50 through the I/O interface 20 to the database 18 for storage.

Figure 2:
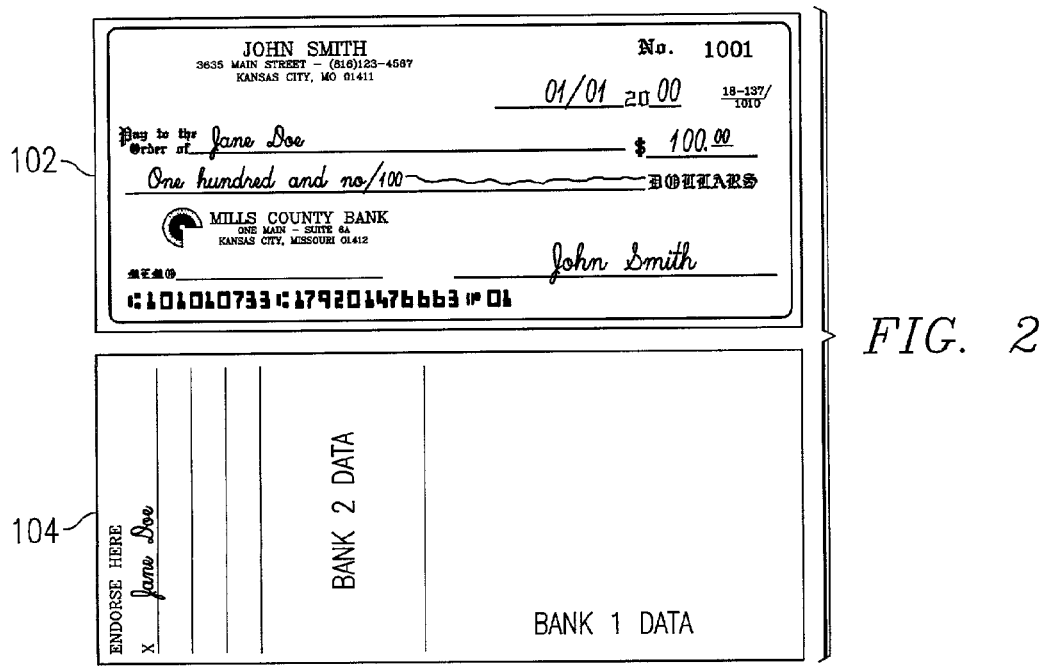
FIG. 2 is a block diagram illustrating images of a check processed by the system of FIG. 1.

FIG. 2 is a block diagram illustrating images 102 and 104 of a check processed by the system 10. The images comprise a front image 102 of the front of a check and a back image 104 of the back of the check. Each image 102 and 104 is recorded by the digital camera 22, obtained by the image capture host 16 and stored in the database 18, along with processing data. Thus, all the information that is provided by the physical check may be stored as image records 50 in the database 18 for future use. It will be understood that any combination of the images 102 and/or 104 for a check may be stored in the database 18 without departing from the scope of the present invention.

Figure 3:
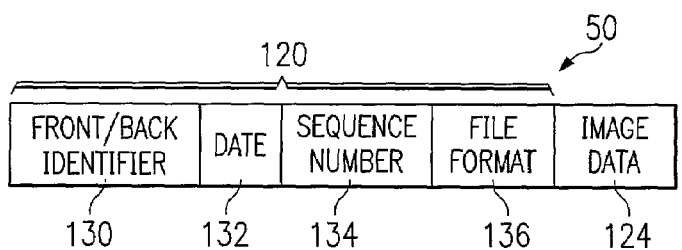
FIG. 3 is a block diagram illustrating an image record stored in the database of FIG. 1 in accordance with one embodiment of the present invention.

FIG. 3 is a block diagram illustrating an image record 50 stored in the database 18 in accordance with one embodiment of the present invention. Each image record 50 comprises header data 120 and image data 124. The header data 120 comprises a front/back identifier field 130, a date field 132, a sequence number field 134 and a file format field 136. The front/back identifier field 130 identifies whether the corresponding digital image comprises a front image 102 or a back image 104 of the check.

The date field 132 comprises a specified date associated with the check, such as a processing date, a date on which the check was presented for payment, or other suitable date. The sequence number field 134 comprises a sequence number for the check. As previously described, the date field 132 and the sequence number field 134 may comprise original data from the previous pass information 40, as opposed to modified date and/or sequence number data based on a subsequent pass of a same check. In this way, subsequently modified data will not result in multiple front image records 50 or multiple back image records 50 being stored in the database 18 for the same check. Instead, each check may be uniquely identified by the date and sequence number and a single front image 102 and/or a single back image 104 may be stored for each check for which an image record 50 is stored.

The file format field 136 identifies a file format for the digital image data recorded by the digital camera 22. The image data 124 comprises the digital image data recorded by the digital camera 22. Thus, each image record 50 comprises identifying and processing information in the header data 120, as well as the actual image of the check in the image data 124.

According to one embodiment, the fields 130, 132, 134 and 136 of the image record 50 are automatically populated based on the processing data received from the check processing system 14 or from the sorter 12 and, in some cases, based on the previous pass information 40 from the check processing system 14.

Figure 4:
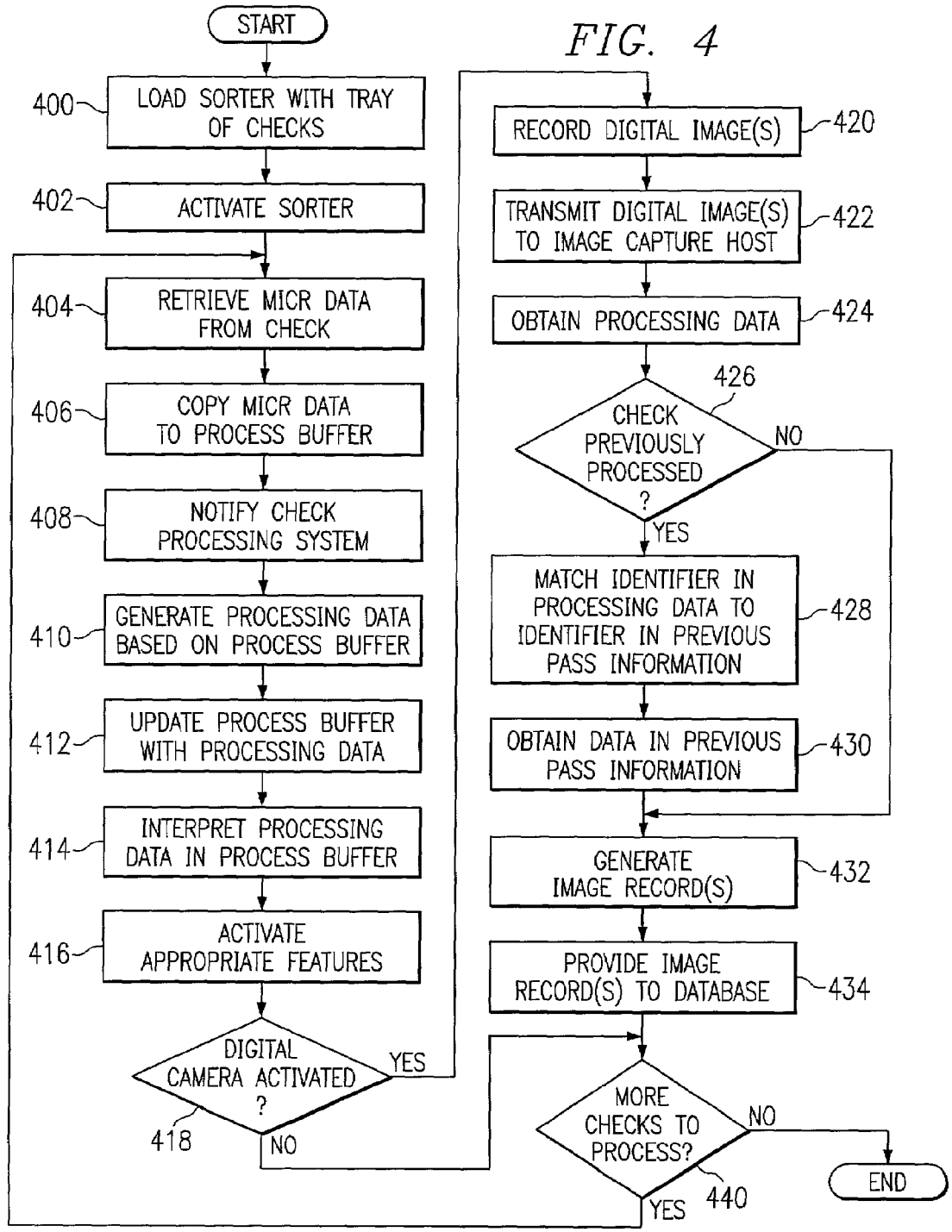
FIG. 4 is a flow diagram illustrating a method for processing images for the system of FIG. 1 in accordance with one embodiment of the present invention.

FIG. 4 is a flow diagram illustrating a method for processing images for the system 10 in accordance with one embodiment of the present invention. The method begins at step 400 where the sorter 12 is loaded with a tray of checks. At step 402, the sorter 12 is activated. At step 404, the MICR reader 24 retrieves MICR data from a check. At step 406, the MICR data retrieved by the MICR reader 24 is copied to the process buffer in the memory 32. The sorter 12 then notifies the check processing system 14 that the process buffer contains data for a check in step 408.

At step 410, the check processing system 14 generates processing data for the check based on the process buffer. At step 412, the check processing system 14 updates the process buffer with the processing data. At step 414, the interface 34 interprets the processing data in the process buffer. At step 416, the interface 34 activates the appropriate features 22, 26 and/or 28 in accordance with the processing data.

At decisional step 418, a determination is made regarding whether or not the digital camera 22 has been activated. If the digital camera 22 has been activated, the method follows the Yes branch from decisional step 418 to step 420 where the digital camera 22 records one or more digital images of the check. As described in more detail above, the digital camera 22 may record a front image 102 and/or a back image 104 of the check. In addition, each image 102 or 104 recorded by the digital camera 22 may be either black and white, gray scale or color.

At step 422, the digital camera 22 transmits the digital image(s) of the check to the image capture host 16 using TCP/IP or other suitable type of communication. According to one embodiment, each digital image recorded by the digital camera 22 is transmitted to the image capture host 16. Alternatively, only specified digital images may be transmitted. At step 424, the image capture host 16 obtains the processing data for the check from the process buffer of the memory 32 in the sorter 12 or from the check processing system 14.

At decisional step 426, the image capture host 16 determines whether the check has been processed previously by the check processing system 14. If the check has been processed previously by the check processing system 14, the method follows the Yes branch from decisional step 426 to step 428.

At step 428, the image capture host 16 matches an identifier for the check in the processing data to an identifier in the previous pass information 40 of the check processing system 14. At step 430, the image capture host 16 obtains at least a portion of the data in the previous pass information 40 for the check. According to one embodiment, the image capture host 16 obtains a date and a sequence number for the check from the previous pass information 40.

At step 432, the image capture host 16 generates one or more image records 50 for the check. Each image record 50 comprises header data 120, including any original data retrieved from the previous pass information 40, and image data 124 from the digital camera 22. At step 434, the image capture host 16 provides the image records 50 through the I/O interface 20 to the database 18 for storage.

At decisional step 440, the sorter 12 makes a determination regarding whether there are more checks to process. If there are more checks to process, the method follows the Yes branch from decisional step 440 and returns to step 404 where the MICR reader 24 retrieves MICR data from a subsequent check. However, if there are no more checks to process, the method follows No branch from decisional step 440 at which point the method comes to an end.

Returning to decisional step 426, if the check has not been processed previously by the check processing system 14, the method follows the No branch from decisional step 426 to step 432 where the image capture host 16 generates one or more image records 50 for the check.

Returning to decisional step 418, if the digital camera 22 has not been activated, the method follows the No branch from decisional step 418 to decisional step 440 where the sorter 12 makes a determination regarding whether there are more checks to process, as previously described.

In this way, digital images of the checks may be transmitted directly from the digital camera 22 of the check sorter 12 to the image capture host 16 using TCP/IP. Also, the image capture host 16 may generate storable image records 50 for storage in the database 18 which is external to the sorter 12, resulting in a substantial amount of memory available for storing the image records 50. In addition, the image records 50 may be retrieved from the database 18 by any hardware and/or software component that is capable of accessing the database 18.

Although the present invention has been described with several embodiments, various changes and modifications may be suggested to one skilled in the art. It is intended that the present invention encompasses such changes and modifications as fall within the scope of the appended claims.

What is claimed is:

1. A system for imaging checks, each check comprising a financial instrument associated with a financial institution, comprising:
    an image capture host coupled to a sorter operable to sort a plurality of checks, to retrieve data from the checks and to record digital images of the checks, the image capture host operable to obtain the digital images of the checks recorded by the sorter;
    a processing system communicably coupled to the sorter and the image capture host and operable to:
        process each check based on the data retrieved from the check by the sorter in order to generate processing data for the check; and
        to store previous pass information for each check for which processing data was previously generated, the previous pass information comprising at least a portion of the previously generated processing data; and
    at least one computer-processable medium storing a database external to the sorter and coupled to the image capture host, the database operable to store the digital images of the checks obtained by the image capture host and the previous pass information; and
    wherein, in the event of restarting processing for at least a subset of the plurality of checks, the image capture host is further operable to:
        obtain the processing data generated for each check previously processed by the processing system; and
        automatically determine whether processing data was previously generated for a specified check and, if processing data was previously generated for the specified check, to obtain at least a portion of the previous pass information for the specified check from the database via the processing system such that the specified check is not reprocessed in order to generate processing data for the specified check.

2. The system of claim 1, the image capture host further operable to generate an image record for storage in the database, the image record comprising at least a portion of the processing data for a specified check and the digital image of the specified check.

3. The system of claim 1, the image capture host further operable to generate an image record for storage in the database, the image record comprising at least a portion of the processing data for the specified check, the digital image of the specified check and, if processing data was previously generated for the specified check, at least a portion of the previous pass information for the specified check.

4. The system of claim 1, the sorter comprising a digital camera, the digital camera coupled to the image capture host and operable to record the digital images of the checks and to transmit the digital images of the checks to the image capture host.

5. The system of claim 4, the digital camera further operable, to transmit the digital images of the checks to the image capture host using Transmission Control Protocol/Internet Protocol (TCP/IP).

6. A method for imaging checks, each check comprising a financial instrument associated with a financial institution, comprising:
    retrieving data from a plurality of checks at a sorter,
    processing each check based on the data retrieved from the check in order to generate processing data for the check;
    in the event of processing failure and restart:
        automatically determining whether processing data was previously generated for a specified check; and automatically obtaining at least a portion of previous pass information from a database external to the sort for the specified check if processing data was previously generated for the specified check, the previous pass information comprising at least a portion of the previously generated processing data such that the specified check is not reprocessed in order to generate processing data for the specified check;

identifying a subset of the checks for imaging based on the processing data for each of the checks;

recording digital images of the identified checks;

obtaining the recorded digital images of the checks using TCP/IP; and storing the obtained digital images of the checks in the database external to the sorter.

7. The method of claim 6, obtaining the recorded digital images of the checks comprising receiving the recorded digital images of the checks from a digital camera.

8. The method of claim 6, further comprising generating an image record for storage in the database, the image record comprising at least a portion of the processing data for a specified check and the digital image of the specified check.

9. The method of claim 6, further comprising generating an image record for storage in the database, the image record comprising at least a portion of the processing data for the specified check, the digital image of the specified check and, if processing data was previously generated for the specified check, at least a portion of the previous pass information for the specified check.

10. A system for imaging checks, comprising logic comprising executable instructions stored on at least one computer-processable medium and operable to:

obtain digital images of a plurality of checks from a sorter using TCP/IP, each check comprising a financial instrument associated with a financial institution;

determine whether processing data was previously generated for a specified check and to obtain at least a portion of previous pass information from a database external to the sorter for the specified check if processing data was previously generated for the specified check, the previous pass information comprising at least a portion of the previously generated processing data;

if processing data was not previously generated for the specified check, generate processing data for the specified check based, at least in part, on the digital image obtained from the sorter; and generate an image record for storage in the database, the image record comprising at least a portion of the processing data for the specified check and the digital image of the specified check.

11. The system of claim 10, the logic further operable to obtain the digital images of the checks by receiving the digital images of the checks from a digital camera for the sorter.

12. The system of claim 10, the logic further operable to generate an image record for storage in the database, the image record comprising at least a portion of the processing data for the specified check, the digital image of the specified check and, if processing data was previously generated for the specified check, at least a portion of the previous pass information for the specified check.

* * * * *